United States Patent [19]
Nagayama et al.

[11] Patent Number: 5,472,128
[45] Date of Patent: Dec. 5, 1995

[54] METHOD AND APPARATUS FOR SUCKING AN OPTICAL FIBER

[75] Inventors: Katsuya Nagayama; Toshifumi Hosoya, both of Yokohama, Japan

[73] Assignee: Sumitomo Electric Industries, Ltd., Osaka, Japan

[21] Appl. No.: 123,841

[22] Filed: Sep. 9, 1993

Related U.S. Application Data

[62] Division of Ser. No. 884,185, May 18, 1992, Pat. No. 5,322,228.

[30] Foreign Application Priority Data

| May 20, 1991 | [JP] | Japan | 3-35423 |
| May 27, 1991 | [JP] | Japan | 3-121039 |
| Jun. 5, 1991 | [JP] | Japan | 3-159911 |
| Jul. 15, 1991 | [JP] | Japan | 3-63435 |
| Jan. 17, 1992 | [JP] | Japan | 4-6074 |
| Apr. 23, 1992 | [JP] | Japan | 4-104339 |

[51] Int. Cl.⁶ .......... B65H 20/00
[52] U.S. Cl. .......... 226/97; 57/261; 57/279; 57/350
[58] Field of Search .......... 226/97, 7; 57/261, 57/279, 350

[56] References Cited

U.S. PATENT DOCUMENTS

| 1,881,383 | 10/1932 | Wylie . | |
| 3,165,275 | 1/1965 | Furst | 242/35.6 R X |
| 3,198,446 | 8/1965 | Furst et al. | 242/35.6 R |
| 3,420,459 | 1/1969 | Peters | 242/25 |
| 3,688,957 | 9/1972 | Beddoe et al. | 226/97 X |
| 3,776,479 | 12/1973 | Lutovsky et al. | 242/35.6 R |
| 3,852,141 | 12/1974 | Gross . | |
| 3,986,328 | 10/1976 | Ritter et al. | 226/97 X |
| 4,387,863 | 6/1983 | Edmonston et al. | 242/118.4 |
| 5,044,148 | 9/1991 | Fujiwara | 57/261 X |
| 5,065,928 | 11/1991 | Davey et al. | 226/97 X |
| 5,142,856 | 9/1992 | Nakayama et al. | 57/261 V |
| 5,205,851 | 4/1993 | Suganuma et al. | 65/4.21 |

FOREIGN PATENT DOCUMENTS

| 142813 | 5/1985 | European Pat. Off. . |
| 3911505 | 10/1990 | Germany . |
| 62-91441 | 4/1987 | Japan . |
| 6438379 | 2/1989 | Japan . |
| 1167188 | 6/1989 | Japan . |

OTHER PUBLICATIONS

Patent Abstracts of Japan, vol. 11, No. 300 (C–449) (2747), 29 Sep. 1987 of 62–91441.
English Language abstract of Japanese Patent Publication No. 64–38379.
English language abstract of Japanese Publication No. 1–167188.

*Primary Examiner*—Daniel P. Stodola
*Assistant Examiner*—William Stryjewski
*Attorney, Agent, or Firm*—Sandler, Greenblum & Bernstein

[57] ABSTRACT

A method and apparatus for sucking a free end of an optical fiber includes a sucking nozzle. The sucking nozzle is positioned downstream of a capstan wheel around which the optical fiber is wound. The opening of the sucking nozzle is positioned within a range of movement of a path line of the free end of the optical fiber. The path line of the end of the optical fiber moves in accordance with the speed of travel of the optical fiber. The sucking nozzle is positioned perpendicular to a plane defined by the path line of movement of the end of the optical fiber and transverse to an axis of the capstan. Thus, the sucking nozzle is positioned to reliably suck a free end of the optical fiber for a broad range of speeds of the optical fiber.

11 Claims, 13 Drawing Sheets

METHOD AND APPARATUS FOR SUCKING AN OPTICAL FIBER

This application is a division of application Ser. No. 07/884,185, filed on May 18, 1992, now U.S. Pat. No. 5,322,228

BACKGROUND OF THE INVENTION

1. Field of the Invention

The present invention relates to a screening method for conducting tensile strength tests of an optical fiber, a wire or the like by applying a load thereto and an apparatus for carrying out the method.

2. Description of the Related Arts

In the manufacturing line of an optical fiber, in order to guarantee the breakage longevity of the optical fiber, a proof test is conducted. In the test, a weak portion of the optical fiber is broken and removed by applying a certain tensile force to a part of the manufacturing line. The test is conducted by using a screening apparatus.

A conventional screening apparatus is described below with reference to FIGS. 16 and 17. FIG. 16 shows a schematic construction of the conventional screening apparatus. FIG. 17 is a sectional view taken along a line 17—17 of FIG. 16.

The apparatus comprises a feeding roll 1 for feeding out a drawn optical fiber 2; a capstan wheel 3, around which the optical fiber 2 is wound, for supporting the optical fiber 2 by means of a capstan belt 4; a screening roll 5; a tension roll 6; a winding roll 7 for winding the optical fiber 2 to which tension has been applied by a torque between the capstan wheel 3 and the screening roll 5; an arm type feeding dancer 8 provided between the feeding roll 1 and the capstan wheel 3; an arm type winding dancer 9 disposed between the tension roll 6 and the winding roll 7. The feeding dancer 8 and the winding dancer 9 absorb the fluctuation of speed and tension of the optical fiber 2 between the capstan wheel 3 and the feeding roll 1 and between the capstan wheel 3 and the winding roll 7.

According to the screening apparatus, the optical fiber 2 is fed out from the feeding roll 1 and tension is applied thereto between the capstan wheel 3 and the screening roll 5, then, wound around the winding roll 7. The line speed is determined by the drive of the capstan wheel 3. The feeding dancer 8 and the winding dancer 9 absorb the fluctuation of speed and tension between the capstan wheel 3 and the feeding roll 1 and between the capstan wheel 3 and the winding roll 7. Tension is applied to the optical fiber 2 between the capstan wheel 3 and the screening roll 5, and the optical fiber 2 is broken at a low strength portion thereof. Thus, the low strength portion of the optical fiber 2 is not wound around the winding roll 7.

Owing to the screening test, the low strength portion of the optical fiber 2 is not wound around the winding roll 7. But it is necessary to manually install the optical fiber 2 on the path line again. Japanese Patent Laid-Open Publication No. 62-91441 discloses that the optical fiber can be manually mounted on a path line easily by reciprocating a guide roller during drawing process which is required to be continuously operated for a certain period of time.

According to the conventional screening apparatus, the low strength portion of the optical fiber 2 is not wound around the winding roll 7 because the optical fiber 2 is broken at a low strength portion thereof owing to the screening test. But winding operation is suspended when the optical fiber 2 is broken. Therefore, it is necessary to mount the optical fiber 2 on the path line manually when the optical fiber 2 has been broken. It is necessary to automatically mount the optical fiber 2 on the complicated path line by gripping the optical fiber 2 after it is broken at the low strength portion. It is particularly difficult to automatically mount the optical fiber 2 on the winding dancer 9 because the optical fiber 2 needs to be turned plural times as shown in FIG. 17 so as to absorb the fluctuation of the speed and tension of the optical fiber.

In addition, it is necessary to suspend the operation or manually rewind the optical fiber in a subsequent process in order to remove a defective portion other than the low strength portion, such as a random thickness, a bubble-mixed portion, a different-diameter portion or an abnormal projection. Thus, the operation is inefficiently performed.

SUMMARY OF THE INVENTION

It is an object of the present invention to provide a screening method for automatically mounting an optical fiber on the path line thereof with ease after it has been broken at a weak portion thereof and an apparatus for carrying out the method.

In accomplishing this and other objects, there is provided an apparatus for automatically screening an optical fiber having: a capstan wheel around which the optical fiber is wound; a winding roll around which the optical fiber fed out from the capstan wheel is wound; a screening roll for breaking and removing a weak portion of the optical fiber by applying tensile force between the capstan wheel and the winding roll; and a plurality of dancer rolls, disposed between the screening roll and the winding roll, for absorbing the fluctuation of the feed-out speed of the optical fiber and tensile force applied hereto due to the pivotal motion of an arm. In the above apparatus, as an improved construction, there is a sucking device, disposed downstream of the capstan wheel in the transporting direction of the optical fiber, for sucking the optical fiber when the optical fiber is broken; stopping means for stopping the operation of the capstan wheel when the optical fiber is broken; and automatic transporting/mounting means for transporting the succeeding portion of the optical fiber to the winding roll when the operation of the capstan wheel is stopped as a result of the breakage of the optical fiber.

In the above construction, a plurality of dancer rolls are provided in a pivotal axial direction of the arm; a plurality supporting rolls for applying tensile force to the optical fiber are provided between the screening roll and one of the dancer rolls and between the dancer rolls adjacent to each other; and at least a part of the supporting rolls is movable between the path line of the optical fiber and the move-away position thereof.

In the above construction, there are provided detecting mean for detecting a defective portion of the optical fiber; and cutting means, disposed downstream of the capstan wheel in the transporting direction of the optical fiber, for cutting the optical fiber at a defective portion thereof based on information supplied by the detecting means when the defective portion of the optical fiber is passing the cutting means.

In the above construction, the automatic transporting/mounting means comprises gripping means for gripping the succeeding portion of the optical fiber; and the gripping means has a hand of opening/closing type for gripping the optical fiber.

In the above construction, the automatic transporting/ mounting means comprises gripping means for gripping the succeeding portion of the optical fiber; and the gripping means has a sucking/holding device for sucking and holding the optical fiber.

In the above construction, the automatic transporting/ mounting means comprises gripping means for gripping the succeeding portion of the optical fiber; and the gripping means has a pair of rotatable rolls for holding the optical fiber therebetween by applying tensile force thereto.

In the above construction, a capstan belt which is rotatable is provided in contact with the capstan wheel and a feeding dancer which is pivotal is provided upstream of the capstan belt is at the move-away position and the feeding dancer absorbs the speed fluctuation of the optical fiber when the automatic transporting/mounting means transports the optical fiber as the result of breakage of the optical fiber.

According to the above construction, when an optical fiber has been broken, the low-strength portion thereof is sucked by the sucking device and the drive stopping means stops the capstan wheel and the line stops. As a result, the automatic transporting/mounting means transports the succeeding portion of the optical fiber to the winding roll. The dancer rolls disposed in the axial direction of the pivotal arm reciprocates the supporting rolls, which eliminates a complicated winding of the optical fiber on the dancer rolls. In addition, the detecting means detects defects of the optical fiber which is cut by the cutting means. Therefore, defective portions of the optical fiber are prevented from being wound around the winding roll.

In a method for screening an optical fiber in which a screening roll for breaking and removing a low strength portion of the optical fiber by applying tensile force thereto is disposed between a capstan wheel around which the traveling optical fiber is wound and a winding roll around which the optical fiber fed out from the capstan wheel is wound; and a first sucking device and a second sucking device are disposed downstream of the capstan wheel and upstream of the winding roll, respectively. The method comprises the steps of: stopping the travel of the optical fiber when the optical fiber has been broken; operating the first and second sucking devices so that the first sucking device grips one end portion of the optical fiber disposed downstream of the capstan wheel; and the second sucking device grips the other end portion of the optical fiber disposed upstream of the winding roll; keeping the second sucking device operating so that the second sucking device processes the other end portion of the optical fiber wound around the winding roll; and stopping the first sucking device so that the one end portion of the optical fiber is released from the first sucking device and installed on the path line of the optical fiber and the one end portion of the optical fiber is installed on the winding roll.

According to the method, when an optical fiber has been broken, the low-strength portion thereof is sucked by the first and second sucking devices and the capstan wheel is stopped and the manufacturing line stops. While the second sucking device grips an end portion of the optical fiber with tensile force applied thereto, the end portion of the optical fiber is automatically processed. On the first sucking device, the automatic transporting/mounting device transports the succeeding portion of the optical fiber to the winding roll. Thus, the screening operation is resumed.

According to another preferred embodiment, there is provided an apparatus for sucking an optical fiber having a sucking nozzle disposed downstream of a capstan wheel around which the traveling optical fiber is wound, in which a sucking opening of the sucking nozzle is disposed in the movable range of the path line of the optical fiber which changes according to the travel speed of the optical fiber.

According to another preferred embodiment, there is provided an apparatus for sucking an optical fiber having a sucking nozzle disposed downstream of a capstan wheel around which the traveling optical fiber is wound, in which the sucking nozzle is disposed alongside of the path line of the optical fiber; and an opening of the sucking nozzle is positioned to be perpendicular to the path line.

According to the above construction, when an optical fiber traveling at a high speed has been broken, the optical fiber fed out from the capstan wheel is sucked by the sucking device. since the sucking nozzle is positioned in the movable range of the path line of the optical path, the broken optical fiber can be reliably sucked even though the travel speed of the optical fiber changes. Further, since the sucking nozzle is disposed alongside of the path line of the optical fiber, the leading end of the optical fiber can be easily mounted on the line and the broken optical fiber can be easily collected.

According to another preferred embodiment, there is provided an apparatus for continuously winding an optical fiber comprising: a winding reel, rotatably supported, for winding the optical fiber; a guide roller disposed in the vicinity of the winding reel and supported to be movable in a direction along the shaft of the winding reel; a cutter for cutting the optical fiber; and a tape sticking device for retaining end portion of the optical fiber which has been cut on the winding reel.

In the above construction, a slit is formed on a flange of the winding reel; and a detecting means for detecting the position of the slit is formed so that the optical fiber is inserted through the slit at a predetermined rotational position of the winding reel; and the end portion of the optical fiber is retained on the outer surface of the flange by means of a tape.

According to the above construction, the tape sticking device fixes the end portion of the optical fiber to the surface of the winding reel and as such, the optical fiber wound around the winding reel does not loosen during transportation. Thus, the optical fiber is prevented from being damaged. The end portion of the optical fiber is retained with a tape on the outer surface of the flange. Thus, the end portion of the optical fiber can be easily processed.

According to another preferred embodiment, there is provided a winding reel for winding an optical fiber around a drum thereof comprising: two slits provided on a flange of the winding reel, in which the length of one of the two slits is substantially equal to the distance obtained by subtracting the radius of the drum of the winding reel from the radius of the flange; and the bottom end of the other slit does not reach the cylindrical surface obtained when the optical fiber is wound around the drum to the maximum.

In the above construction, the line connecting the one slit and the center of the flange with each other makes an angle 90° or more with the line connecting the other slit and the center of the flange with each other.

In the above construction, the outer surface of the flange is smooth.

In the above construction, two slits are formed on a flange dividing the drum into a lead winding portion for winding the forward end of the optical fiber and a portion for winding the optical fiber are provided on a flange; and the diameter of a flange disposed at an outer end of the lead winding portion is smaller than that of the flange dividing the drum into the lead winding portion and the portion for winding the optical fiber.

According to the above construction, tape-sticking position can be easily set. Therefore, the end portion of the optical fiber can be easily processed. In addition, the forward end and backward end of the optical fiber are locked on the same plane and the backward end thereof can be locked at the same position irrespective of the length of the optical fiber which has been wound around the drum of the winding reel.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
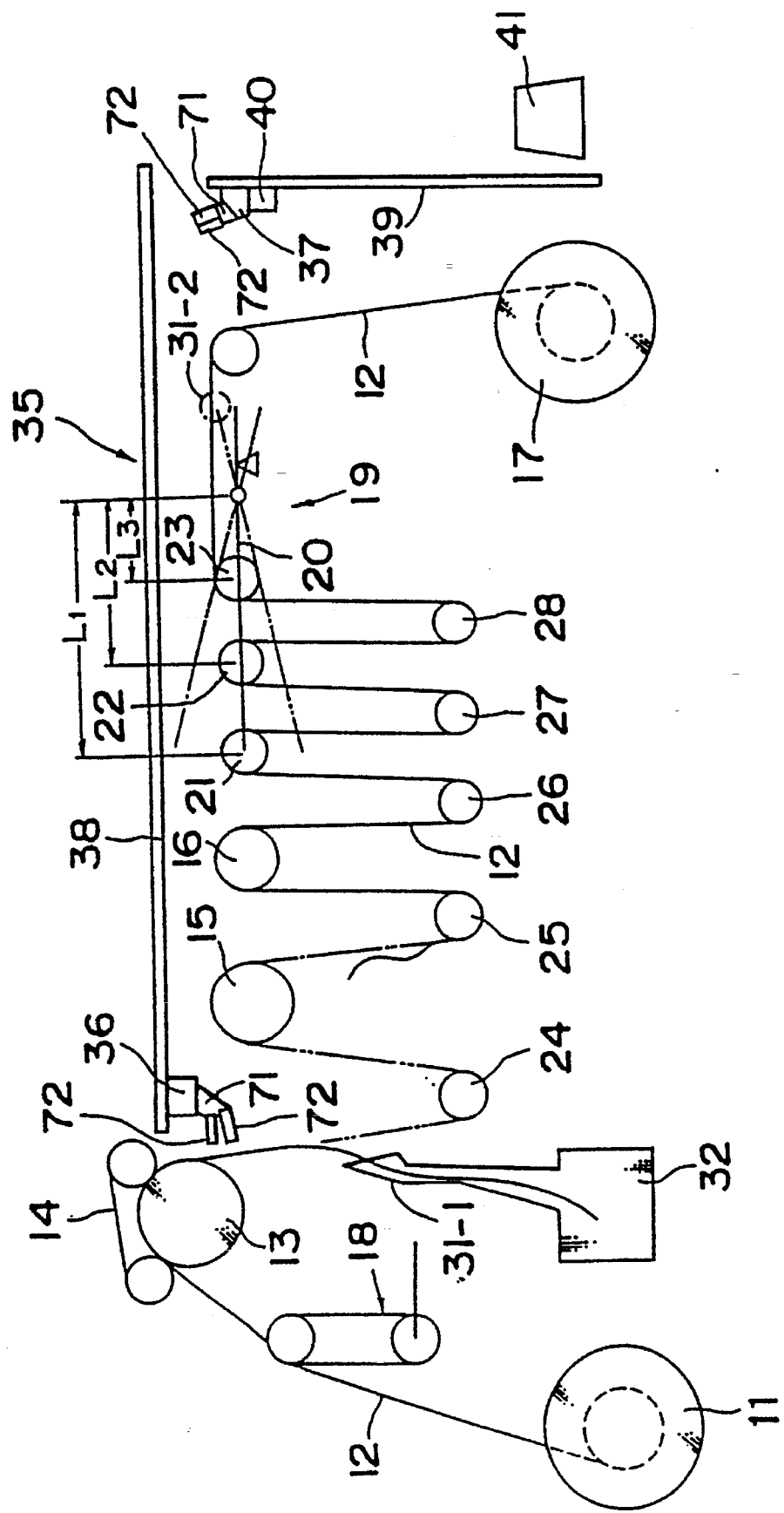
FIG. 1 is a schematic construction view showing an automatic screening apparatus, according to an embodiment of the present invention, in which an optical fiber has been broken.

Before the description of the present invention proceeds, it is to be noted that like parts are designated by like reference numerals throughout the accompanying drawings.

Figure 2:
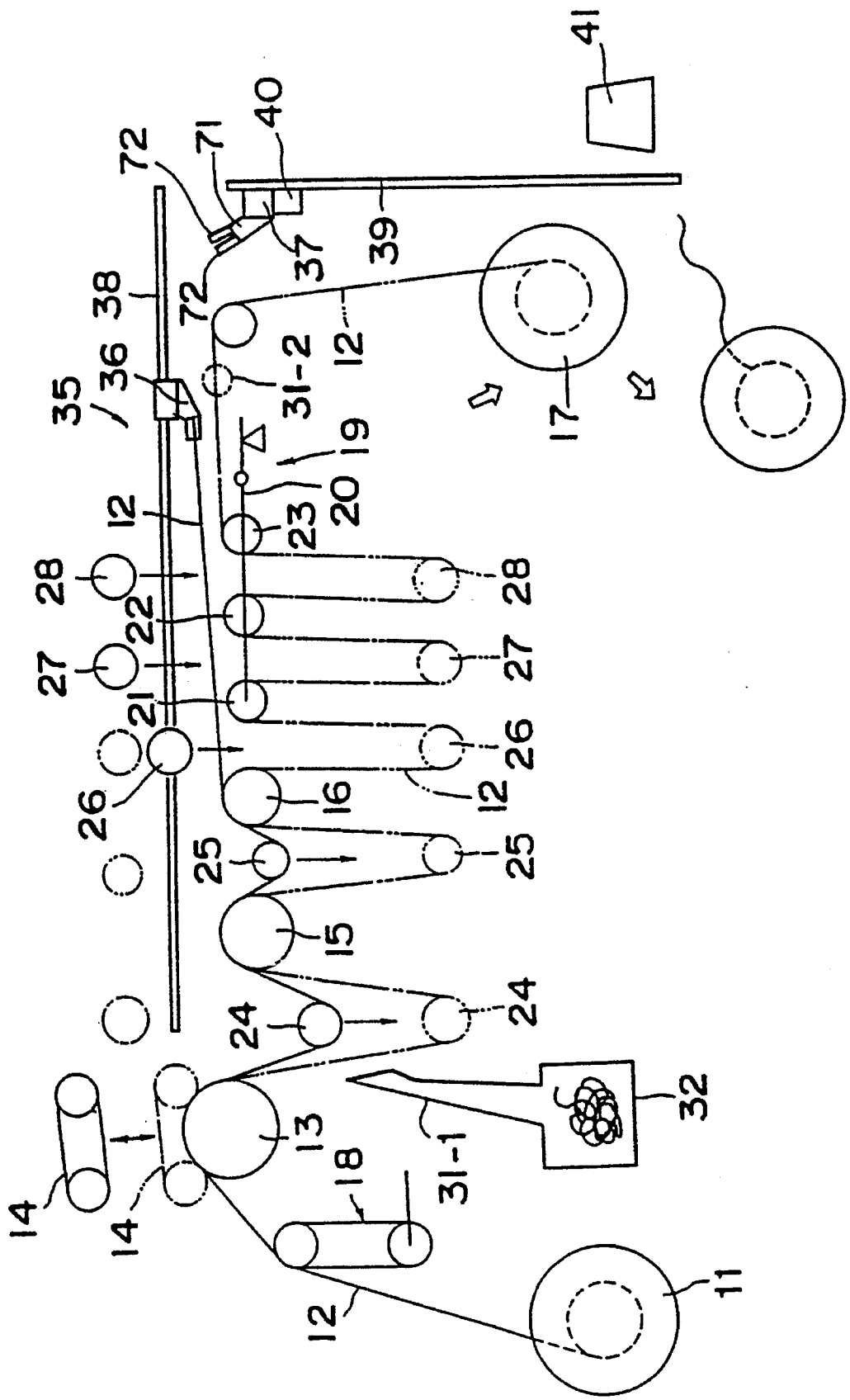
FIG. 2 is a schematic construction view showing an automatic screening apparatus, as shown in FIG. 1, in which the optical fiber has been automatically mounted on the path line again.

FIGS. 1 and 2 show a schematic construction of an automatic screening apparatus according to an embodiment of the present invention. FIG. 1 shows a state in which an optical fiber has been broken. FIG. 2 shows a state in which the optical fiber is automatically mounted on the path line again.

The automatic screening apparatus comprises a feeding roll 11 for feeding out a drawn optical fiber 12; a capstan wheel 13, for winding the optical fiber 12 around it, which is driven or stopped and supports the optical fiber 12 in cooperation with a capstan belt 14 capable of moving away from the capstan wheel 13 as shown in FIG. 2. The apparatus further comprises a screening roll 15; a tension roll 16; a winding roll 17 for winding around it the optical fiber 12 to which tension has been applied by torque between the capstan wheel 13 and the screening roll 15; and an arm type feeding dancer 18 disposed between the feeding roll 11 and the capstan wheel 13.

A winding dancer 19 is disposed between the tension roll 16 and the winding roll 17. The winding dancer 19 comprises a pivotal arm 20 and dancer rolls 21, 22, and 23 mounted on the arm 20 and spaced from $L_1$, $L_2$, and $L_3$, respectively, from the pivotal center of the arm 20. Supporting rolls 24, 25, 26, 27, and 28 are disposed between the capstan wheel 13 and the screening roll 15, between the screening roll 15 and the tension roll 16, between the tension roll 16 and the dancer roll 21, between the dancer roll 21 and the dancer roll 22, and between the dancer roll 22 and the dancer roll 23, respectively. The supporting rolls 24, 25, 26, 27, and 28 are reciprocative between the path line of the optical fiber 12 and the move-away position thereof. That is, they are capable of moving upward from the move-away position thereof.

A first sucking nozzle 31-1 for sucking the optical fiber 12 which has been broken is disposed downstream of the capstan wheel 13 in the transporting direction of the optical fiber 12. The sucked optical fiber 12 is accommodated in an accommodating box 32.

A second sucking nozzle 31-2 for sucking the optical fiber 12 and an unshown box for accommodating the sucked optical fiber 12 are disposed upstream of the winding roll 17. An automatic fiber transporting/mounting means 35 comprises a crossfeed device 36 for transporting the succeeding portion of the optical fiber 12 from the capstan wheel 13 to a position above the winding roll 17 and a transporting/mounting device 37 for transporting the optical fiber 12 from the position above the winding roll 17 to the winding roll 17 and mounting it on the winding roll 17. The crossfeed device 36 and the transporting/mounting device 37 are supported by a guide rail 38 and a guide rail 39, respectively. A cutter 40 for cutting the optical fiber 12 is supported by the guide rail 39. A tape sticking device 41 fixes an end portion of the optical fiber 12 to the outer surface of flange of the winding roll 17.

The crosssfeed device 36 and the transporting/mounting device 37 are provided with a gripping means 71 for gripping the succeeding portion of the optical fiber 12. The gripping means 71 comprises a pair of hands 72 of opening/closing type. The hands 72 closes to sandwich the optical fiber 12 therebetween. An unshown motor drives the gripping means 71 to travel along the guide rails 38 and 39.

Another embodiment of the present invention is described below with reference to FIGS. 3 and 4.

Figure 3:
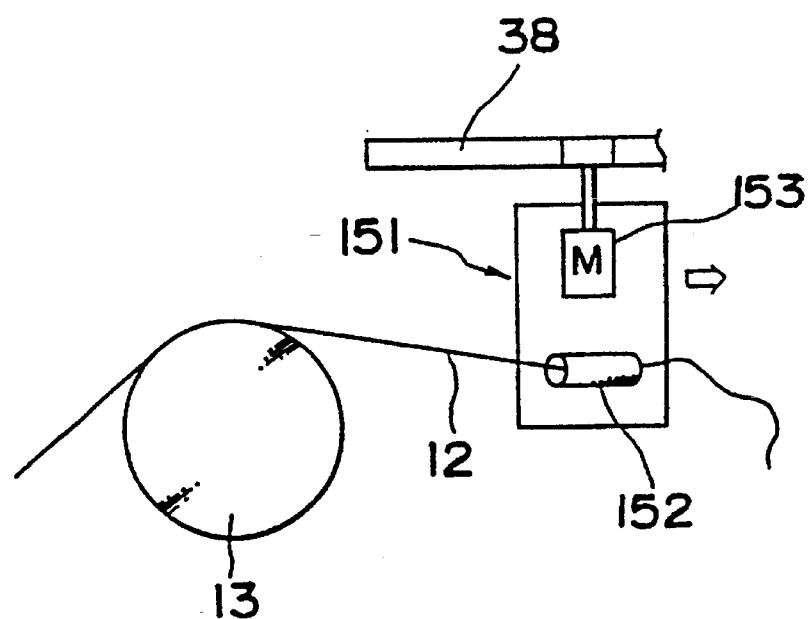
FIG. 3 is a schematic construction view showing a gripping means according to an embodiment of the present invention.

A gripping means 151 sown in FIG. 3 comprises a sucking nozzle 152 for sucking the optical fiber 12 with a constant sucking force, for example, 20g and holding it. A motor 153 drives the gripping means 151 to travel along the guide rails 38 (39).

Figure 4:
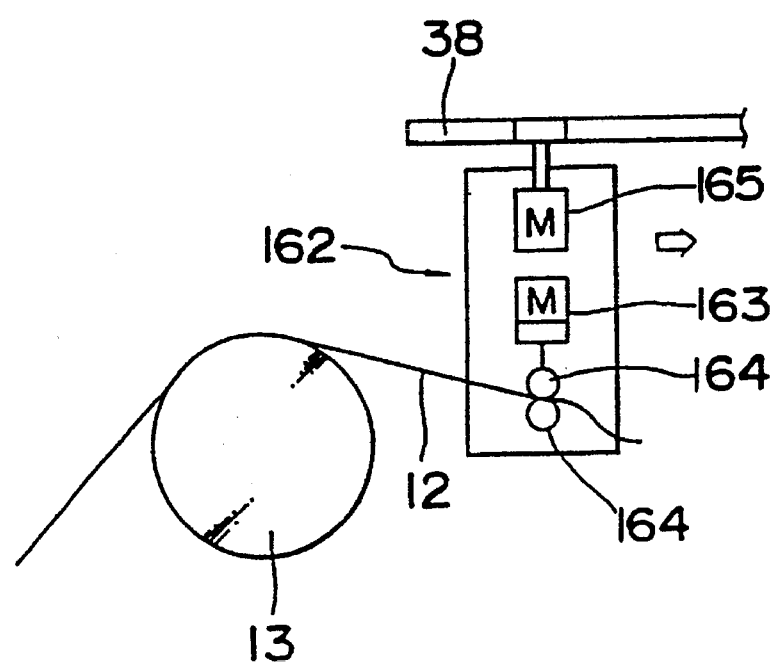
FIG. 4 is a schematic construction view showing a gripping means according to an embodiment of the present invention.

A gripping means 162 shown in FIG. 4, comprising a pair of pinch rollers 164 driven by a torque motor 163 with a constant torque, holds the optical fiber 12 sandwiched between the pinch rollers 164 by applying a constant tensile force to the optical fiber 12. A motor 165 drives the gripping means 162 to travel along the guide rail 38 (39). In the gripping means 162, the pinch rollers 164 are driven by the torque motor 163 at a constant torque irrespective of the travel speed of the motor 165. Thus, the optical fiber 12 is held with a constant tensile force applied thereto.

The operation of the automatic screening apparatus of the above-described construction is described below.

Supposing that tensile force applied to the optical fiber 12 at the feeding roll 11 is smaller than 100 gr and that tensile force of 700 g is applied to the optical fiber 12 between the capstan wheel 13 and the screening roll 15. If the optical fiber 12 has a low strength portion, the optical fiber 12 is broken between the capstan wheel 13 and the screening roll 15. Referring to FIG. 1, when the optical fiber 12 is broken, the reduction of the tensile force of the automatic system is detected. As a result, the sucking nozzle 31-1 starts sucking the optical fiber 12. The sucking nozzle 31-1 reduces the pressure of the suction side by blowing pressurizing air of 5 Kg/cm$^2$ to the discharge side, thus sucking the optical fiber 12 traveling at a speed of 800 m/min. While the sucking nozzle 31-1 is sucking the optical fiber 12, the speed of the feeding roll 11 and that of the capstan wheel 13 decrease and stop. At this time, the sucking nozzle 31-2 is operated and the end portion of the optical fiber 12 is processed.

The operation for processing the end portion of the optical fiber 12 is carried out as follows. First, the tape sticking device 41 fixes the optical fiber 12 to the flange of the winding roll 17. Then, the optical fiber 12 is cut by the cutter 40. The optical fiber 12 thus cut is sucked by the sucking nozzle 31-2 and accommodated in the accommodating box. Thereafter, the operation of the sucking nozzle 31-2 is stopped. Then, the winding roll 17 is replaced with another winding roll that is vacant of the optical fiber 12. These operations are called processing of the end portion of the optical fiber 12. The arm 20 of the winding dancer 19 is fixed at a horizontal position and the supporting rolls 24, 25, 26, 27, and 28 move to the highest position to prepare an automatic fiber installation. Upon stop of the capstan wheel 13, the succeeding portion of the optical fiber 12 is gripped by the hand 72 of the ripping means 71 of the crosssfeed device 36 between the capstan wheel 13 and the sucking nozzle sucking nozzle 31-1. Upon upward movement of the capstan belt 14, the feeding roll 1 feeds out the optical fiber 12. The gripping means 71 travels along the guide rail 38 of the crosssfeed device 36, thus transporting the optical fiber 12 to the position above the winding roll 17.

Thereafter, the supporting rolls 24 through 28 move downward sequentially in the order from the supporting roll 24 to the supporting roll 28, thus forming the path line of the optical fiber 12. The optical fiber 12 which has been gripped by the gripping means 71 of the crosssfeed device 36 is gripped by the gripping means 71 of the transporting/ mounting device 37 above the winding roll 17. As a result, the gripping means 71 of the transporting/mounting device 37 moves downward along the guide rail 39. Then, the end portion of the optical fiber 12 is fixed to the winding roll 17 vacant of the optical fiber 12. Thereafter, the capstan belt 14 moves downward, thus supporting the optical fiber 12 on the capstan wheel 13. At this time, the arm 20 of the winding dancer 19 is allowed to be pivotal. Thus, the automatic fiber installing operation is completed.

When the moving speed of the gripping means 71 changes during the transportation of the optical fiber 12, the feeding dancer 18 pivots because he capstan belt 14 is at the move-away position. Thus, the rotational speed of the feeding roll 11 is adjusted. As a result, the fluctuation of the moving speed of the gripping means 71 is absorbed and consequently, the optical fiber 12 being transported has a constant tensile force.

Experiments for installing the succeeding portion of the optical fiber 12 on the path line were carried out by using the above-described screening apparatus at a moving speed of 800 m/min. The diameter of the first sucking nozzles and that of the second sucking nozzle were 20 mm; air consumption was 0.6 m$^3$/min; and the highest wind speed in the sucking nozzles was 100 m/sec. Fiber waste of approximately 4000 m collected during 10 times of operation for installing the succeeding portion of the optical fiber 12 on the path line was accommodated in the accommodating box of 500 mm. On the second sucking side, the optical fiber 12 traveled about 4 m after it was broken. The second sucking nozzle was 8m distant from the broken position of the optical fiber 12. Therefore, about 4m of the optical fiber 12 was sucked by the second sucking nozzle. The length of the second sucking nozzle was 1 m. Of 1 m, 0.7 m was necessary for processing the end portion of the optical fiber 12. The force for sucking the optical fiber 12 was 30 gf. The optical fiber 12 was not loosened during the processing of the end portion of the optical fiber 12. Fiber waste could be sucked. The succeeding optical fiber 12 could be automatically installed on the path line in experiments conducted 10 times in these condition.

As apparent from the foregoing description, the second sucking device and the tape sticking device are provided in addition to the first sucking device. Thus, the succeeding optical fiber can be automatically installed on the path line after it is broken. The apparatus may be applied to a drawing apparatus. In addition, the apparatus may be utilized to detect defects of a fiber, namely, whether or not the outer diameter of the fiber is the same throughout its length or resin has been applied uniformly throughout its length and remove a wrong portion.

Figure 16:
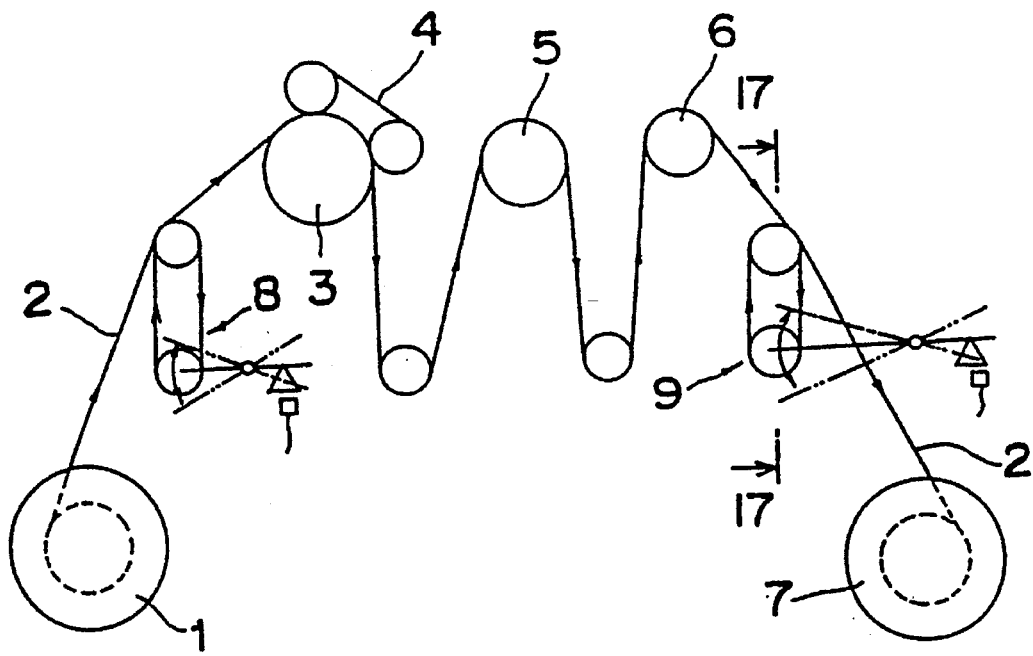
FIG. 16 is a schematic construction view showing a conventional screening apparatus.
Figure 17:
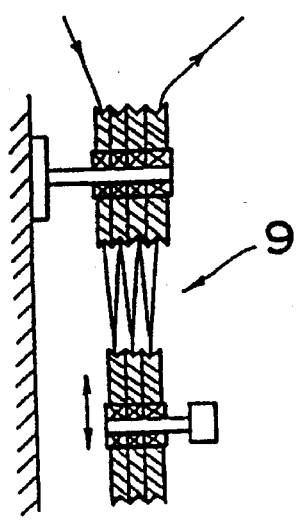
FIG. 17 is a sectional view taken along a line VI—VI of FIG. 16.

Comparison is made between the performance of the conventional winding dancer 9 (FIGS. 16 and 17) and that of the winding dancer 19 of the present invention. Angle change in the conventional dancer 9 necessary for absorbing the fluctuation of a length L is $$\Delta\theta=L/6L$$

where L is the distance between the pivotal center and the dancer roll. Angle change in the dancer 19 of the present invention necessary for absorbing the fluctuation of a length L is $$\Delta\theta=L/2(L_1+L_2+L_3)$$

Accordingly, a sufficient absorption capability can be obtained by making the distances $L_1$, $L_2$, $L_3$ between the pivotal center and each dancer rolls 21, 22, and 23 large.

Figure 5:
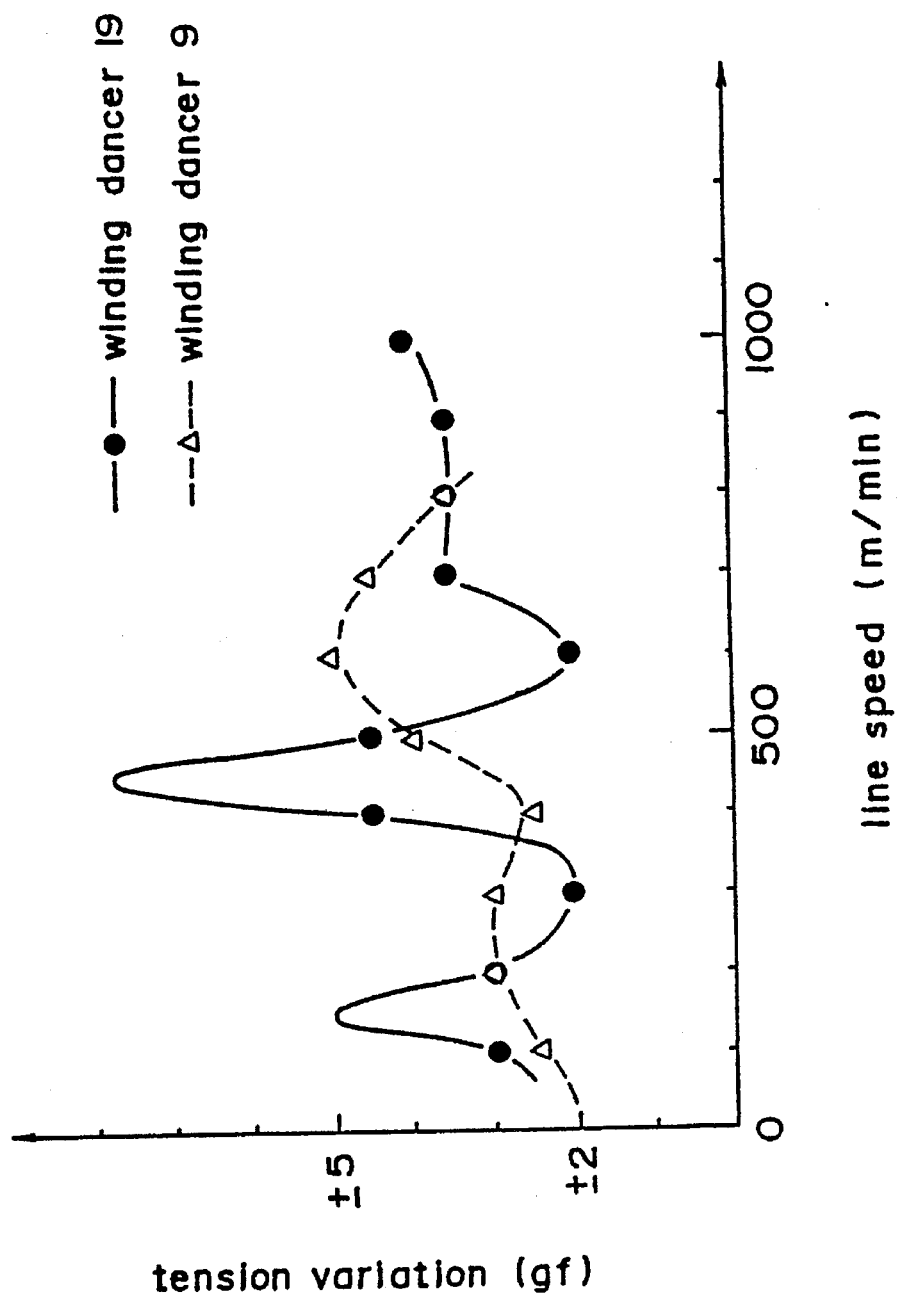
FIG. 5 is a graph showing the relationship between the moving speed of an optical fiber and the fluctuation of tensile force applied thereto.

The response to a slight disturbance depends on the rotational inertia of the dancer rolls 21, 22, and 23 and not so much on the rotational inertia of the arm 20. FIG. 5 shows the relationship between the moving speed of the optical fiber 12 and the fluctuation of tensile force in the conventional winding dancer 9 and the winding dancer 19 of the present invention. As shown in FIG. 5, a resonance occurs partially in the case of the winding dancer 19, which can be solved by adjusting the length of the arm 20. Resonance fluctuation is approximately 3.5 g which does not differ much from that of the conventional winding dancer 9. Thus, the succeeding optical fiber 12 can be automatically installed on the path line after it is broken.

The above-described screening automatic apparatus is capable of automatically installing the succeeding optical fiber 12 while it is being moved with a constant tensile force applied thereto after it is broken.

As described above, the gripping means 151 and 162 shown in FIG. 3 and 4 have gripping operation similar to that of the gripping means 71 having the hand 72. In the case of the gripping means 162, the pair of pinch rollers 164 driven at a constant torque holds the optical fiber 12 by applying a constant tensile force thereto. Further, the fluctuation of the moving speed of the optical fiber 12 can be absorbed due to the pivotal motion of the feeding dancer 18 while the gripping means 162 is transporting the optical fiber 12 along the guide rail. Therefore, a constant tensile force can be reliably kept to be applied to the optical fiber 12.

Figure 6:
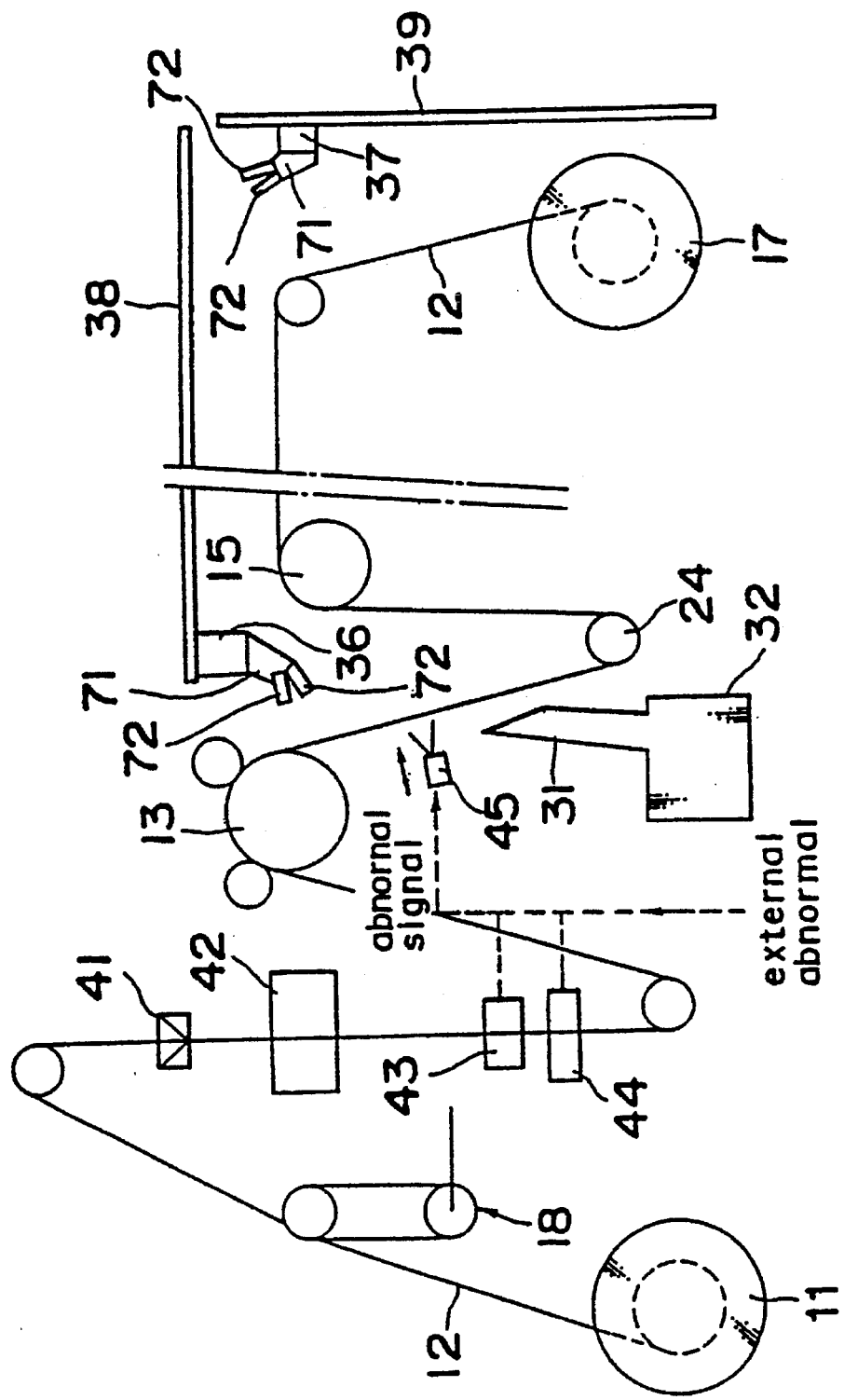
FIG. 6 is a schematic construction view showing an automatic screening apparatus according to an embodiment of the present invention.

Referring to FIG. 6, an embodiment of the present invention is described below. There are provided, between the feeding roll 11 and the capstan wheel 13, a dice 41 for applying ink to the optical fiber 12; an ultraviolet ray irradiating oven 42 for hardening the ink applied to the optical fiber 12; a monitor 43 for detecting a portion if the outer diameter thereof is different from the outer diameter of the optical fiber 12; and a detecting device 44 for detecting a projection formed on the optical fiber 12. A cutter 45 is disposed between the capstan wheel 13 and the sucking nozzle 31. The cutter 45 is driven based on a signal outputted from the monitor 43 and the detecting device 44. The cutter 45 is also driven by information indicating the existence of an irregular portion of the optical fiber 12 and bubble-mixed portion formed during drawing operation.

According to the apparatus of the above construction, ink applied by the dice 41 to the optical fiber 12 fed out from the feeding roll 11 is hardened by the ultraviolet ray irradiating oven 42. If the optical fiber 12 has defects, i.e., if it has a portion of a different diameter or an irregular portion, the monitor 43 or the detecting device 44 detects that, thus supplying a signal indicating the defect to the cutter 45. The cutter 45 cuts the defective portion of the optical fiber 12 when it becomes opposed thereto similarly to the case in which the low strength portion is broken. Then, the defective portion is removed from the optical fiber 12 and then the optical fiber 12 automatically mounted on the path line. The data of the defective portion may be obtained during the drawing of the optical fiber 12 and a signal indicating the existence of the defective portion is sent to the cutter 45. The cutter 45 operates when the defective portion of the optical fiber 12 becomes opposed thereto. Then, similarly to the above, the optical fiber 12 is automatically mounted on the path line.

According to the apparatus of the above construction, the defective portion of the optical fiber 12 can be automatically removed according to the information supplied by the monitor 43 and the detecting device 44 in addition to the low strength portion.

According to the automatic screening apparatus of the present invention, the device for sucking the optical fiber which has been broken is provided. In addition, the automatic fiber installing means is provided to wind and transport the optical fiber which has been broken at a defective point to the capstan wheel while the operation of the capstan wheel is stopped. A plurality of dancer rolls are provided in the axial direction of the pivotal arm so as to move the supporting roll away from the path line. Thus, the automatic fiber installing means performs an easy operation.

In addition, the capstan belt is moved away from the capstan wheel so that he feeding dancer absorbs the fluctuation of the moving speed of the optical fiber during the installation of the succeeding portion of the optical fiber due to the pivotal motion of the feeding dancer. Thus, the optical fiber can be transported with a constant tensile force applied thereto.

According to the automatic screening apparatus of the present invention, means for detecting a defective portion of the optical fiber are provided so that the cutting means cuts the defective portion. That is, the defective portion of the optical fiber can be automatically removed therefrom. Consequently, it is unnecessary to suspend the operation of the line in order to remove the defective portion manually or rewind the optical fiber in the following process. Owing to this construction, the use of fewer machines for rewinding the optical fiber suffices for operation. Hence, a low cost.

A still another embodiment of the present invention is described with reference to FIGS. 7 and 8. A first capstan section of a wire drawing machine according to this embodiment comprises a first capstan wheel 13 around which the drawn optical fiber 12 is wound and rollers 14a through 14c, for guiding a first capstan belt 14, which is driven by a mechanism for driving the first capstan wheel 13. The path line $L_1$ of the optical fiber 12 is appropriately determined according the arrangement of these members.

According to a device for sucking the optical fiber 12 of this embodiment, a sucking nozzle is not provided concentrically with the path line of the optical fiber 12, but reliably sucks the optical fiber 12 not inserted thereinto and traveling at a high speed.

Figure 7:
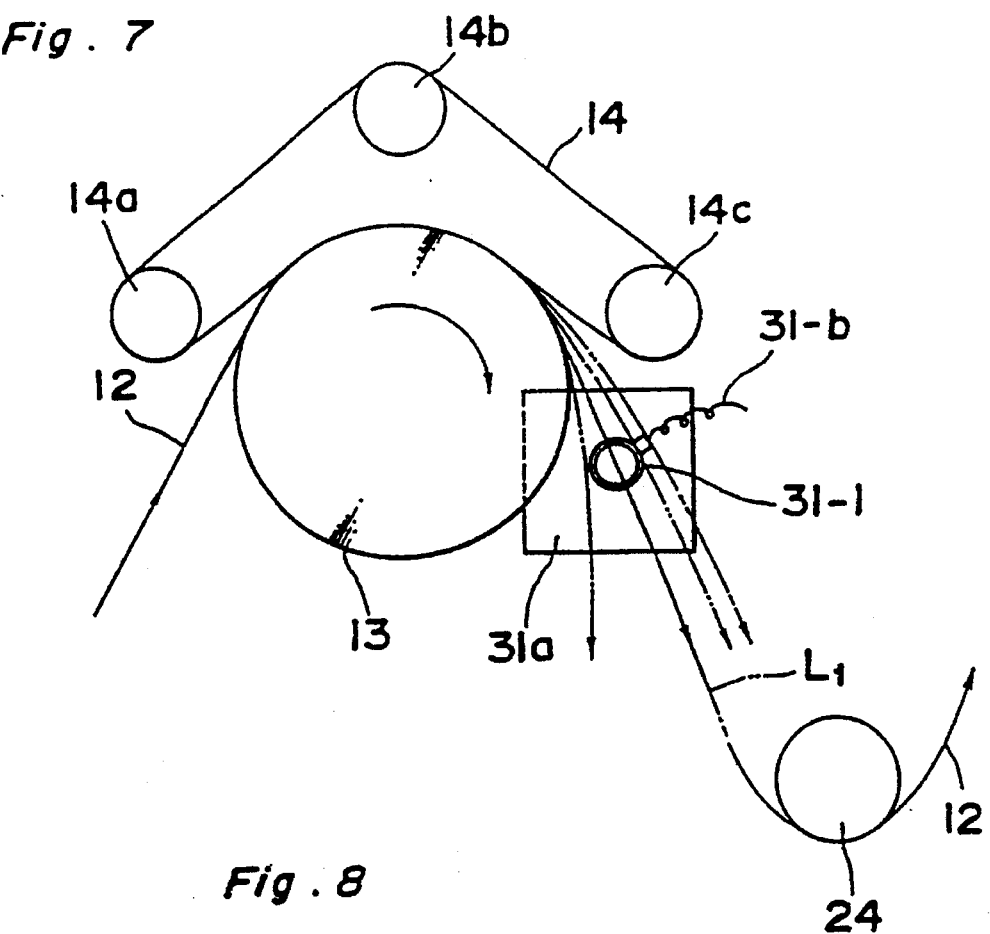
FIG. 7 is a front view showing a sucking device for sucking an optical fiber according to an embodiment of the present invention.
Figure 8:
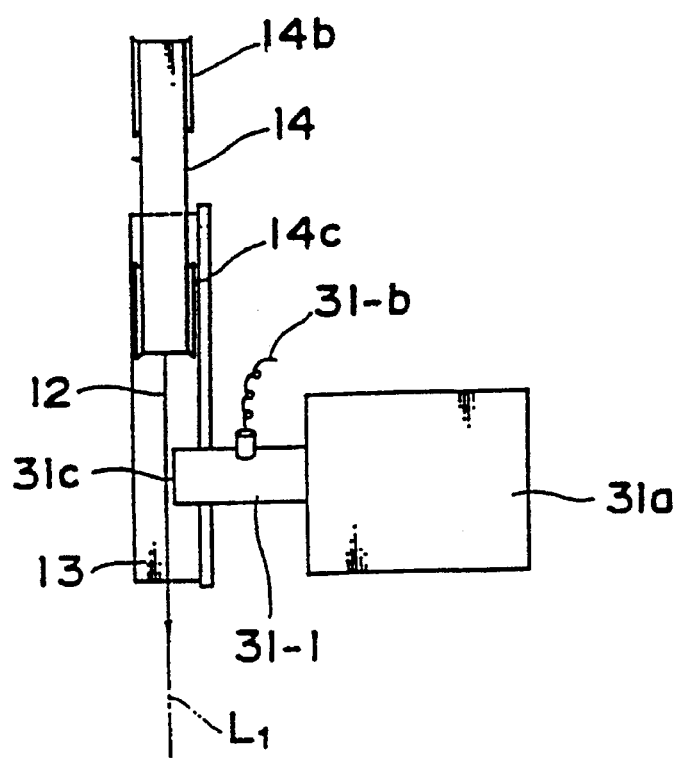
FIG. 8 is a front view showing the sucking device shown in FIG. 7.

As shown in FIGS. 7 and 8, in the first capstan section, a sucking nozzle 31-1 is disposed alongside of the path line $L_1$ in the downstream side of the transporting direction of the optical fiber 12. The sucking nozzle 31-1 is connected with an air hose 31-$b$, at an intermediate portion thereof, connected with an unshown compression air source and a waste fiber accommodating box 31$a$ at the base portion thereof. A sucking opening 31$c$ disposed at the forward end of the sucking nozzle 31-1 is perpendicular to the path line $L_1$.

The sucking nozzle 31-1 is a known one. Compressed air introduced into the intermediate portion thereof through the air hose 31-$b$ circulates in the sucking nozzle 31-1 in the circumferential direction thereof and is rapidly blown out toward the waste fiber accommodating box 31$a$. Thus, ejecting effect generated by the flow of compressed air generates the force of sucking the free end of the broken optical fiber 12 into the sucking opening 31$c$.

Tests for investigating success percentage in sucking the broken optical fiber 12 mounted on various positions were conducted.

FIG. 7 shows the mounting position of the sucking nozzle 31-1 in conducting the sucking test. FIG. 8 shows the path line of the free end of the optical fiber 12 which travels at different speeds.

First, an investigation for finding the optimum mounting position of the sucking nozzle was conducted. In embodiment 1, as shown in FIG. 8, the sucking nozzle was disposed alongside the path line $L_1$ as described in the above-described embodiment. In comparison 1, a Sucking nozzle is disposed coaxially with a path line as done in the conventional art. In comparison 2, the sucking nozzle was disposed below the path line. The test for examining success percentage in sucking the broken optical fiber 12 was conducted under the following condition: The diameter of the sucking nozzle was 22 mm and air was fed from the air hose at a compression pressure of 5 kg/cm$^2$.

TABLE 1

|  |  | embodiment 1 |
|---|---|---|
| position of sucking nozzle |  | alongside path line |
| distance between path line and sucking opening |  | 10 mm |
| succession % at each fiber speed | 20 m/min | 100 |
|  | 100 m/min | 100 |
|  | 400 m/min | 100 |
|  | 800 m/min | 100 |
| operation efficiency |  |  |

Test results indicate the reason the success percentage of sucking force applied from the side of the path line is higher than that applied from the lower portion of the path line as follows: That is, since the optical fiber is composed mainly of quartz glass, it is more rigid than an ordinary fiber. Therefore, when it is broken, the free end of the optical fiber does not hang vertically but takes a position as shown in FIG. 7. The free end of the optical fiber attains approximately a horizontal level as the speed of the optical fiber becomes higher. Therefore, when the opening of the sucking nozzle is disposed near and directly below the path line, the optical fiber becomes distant from the sucking nozzle when it is broken. The faster the speed of the optical fiber travels, the more distant the distance between the optical fiber and the sucking nozzle becomes, which makes it difficult for the sucking nozzle to suck the broken optical fiber. On the other hand, when the sucking nozzle is alongside of the path line, the distance between the opening of the sucking nozzle and the path line does not change beyond the diameter of the opening of the sucking nozzle even though the travel path of the optical fiber is changed. Thus, even though the optical fiber travels at a high speed, the sucking nozzle is capable of easily sucking the broken optical fiber.

Apparently, the broken optical fiber can be sucked by the sucking nozzle even though the sucking nozzle is out of the path line by placing the sucking nozzle at a position within the movable range of the path line which changes depending on the speed of the free end of the broken optical fiber. Theoretically, the greater and the diameter of the opening of the sucking opening is and the shorter the distance between the opening of the sucking nozzle and the path line is, the more reliably the broken optical fiber can be sucked by the sucking nozzle in a wider range when the sucking nozzle is placed alongside the path line.

The relationship between the diameter of the opening of the sucking nozzle and success percentage of suction was examined. The diameters of the openings of sucking nozzles were 8, 22, 50, 75 mm. The optical fiber traveled at a speed of 20 to 800 m/min and forcibly broken with the sucking nozzles disposed alongside the path line. The sucking nozzles were conventional ones. Air pressure was 5 kg/cm$^2$. The result is shown in Table 2.

TABLE 2

|  |  | embodi. 2 | embodi. 1 | embodi. 3 | embodi. 4 |
|---|---|---|---|---|---|
| diameter of sucking nozzle |  | 8 mm | 22 mm | 50 mm | 75 mm |
| distance between path line and sucking opening |  | 10 mm | 10 mm | 10 mm | 10 mm |
| success percentage at each speed of optical fiber | 20 m/min | 100 | 100 | 100 | 100 |
|  | 100 m/min | 90 | 100 | 100 | 100 |
|  | 400 m/min | 40 | 100 | 100 | 50 |
|  | 800 m/min | 10 | 100 | 70 | 0 |

As Table 2 indicates, a sucking nozzle sucks the optical fiber most reliably when the diameter of the opening thereof ranges from 22 to 50 mm. The reason success percentage decreases when the diameter of the opening of the sucking nozzle is large is as follows: According to the test, air pressure is constantly 5 kg/cm$^2$ irrespective of the diameter of the opening. Wind speed in the sucking nozzle having a large diameter in its opening becomes relatively low. Air quantity for sucking the optical fiber is insufficient when the optical fiber travels at a high speed. It may be supposed that the optical fiber can be sucked by a sucking nozzle of a large-diameter opening by increasing the air pressure. But a large-diameter opening increases the cost of an equipment. As Table 2 shows, an opening less than 10 mm is ineffective for sucking the optical fiber. Favorably, the diameter of the opening of the sucking nozzle is at least 10 mm and more favorably, greater than 20 mm.

The relationship between success percentage and the distance between the opening of the sucking nozzle and the path line was examined. Similarly to Embodiment 1 of Table 1, the sucking nozzle was disposed alongside the path line and the optical fiber traveled at a speed of 20 to 800 m/min and was forcibly cut except that the distance between the opening of the sucking nozzle and the path line varied from 5 mm to 50 mm.

The result is shown in Table 3.

TABLE 2

|  |  | embodi. 5 | embodi. 1 | embodi. 6 | embodi. 7 |
|---|---|---|---|---|---|
| distance between path line and sucking opening |  | 5 mm | 10 mm | 30 mm | 50 mm |
| success percentage at each speed of optical fiber | 20 m/min | 100 | 100 | 100 | 100 |
|  | 100 m/min | 100 | 100 | 100 | 90 |
|  | 400 m/min | 100 | 100 | 90 | 60 |
|  | 800 m/min | 100 | 100 | 50 | 0 |

As Table 3 indicates, if the distance between the opening of the sucking nozzle and the path line is smaller than 10 mm, the broken optical could be sucked by the sucking nozzle even though the speed of the optical fiber is as high as 800 /min. The shorter the distance between the opening of the sucking nozzle and the path line is, the higher success percentage is. But if the distance is very short, the sucking nozzle may contact the traveling optical fiber. As a result, the optical fiber may be damaged. Therefore, it is preferable that the distance between the opening of the sucking nozzle and the path line ranges from 5 to 10 mm.

According to the sucking device of the embodiment, the opening of the sucking nozzle is disposed in the movable range of the path line which changes according to the travel speed of the optical fiber. Accordingly, the broken optical fiber can be reliably sucked by the sucking device even though the travel speed of the optical is varied.

The sucking nozzle is disposed alongside the path line and the opening of the sucking nozzle is perpendicular to the path line. Therefore, the end portion of the optical fiber can be easily mounted on the line by the sucking nozzle in a short period of time. In addition, the waste accommodating box is installed on the sucking nozzle. Accordingly, fiber waste can be reliably collected and prevented from being scattered. Thus, the sucking device may be effectively applied to a drawing machine, a machine or rewinding machine.

Figure 9:
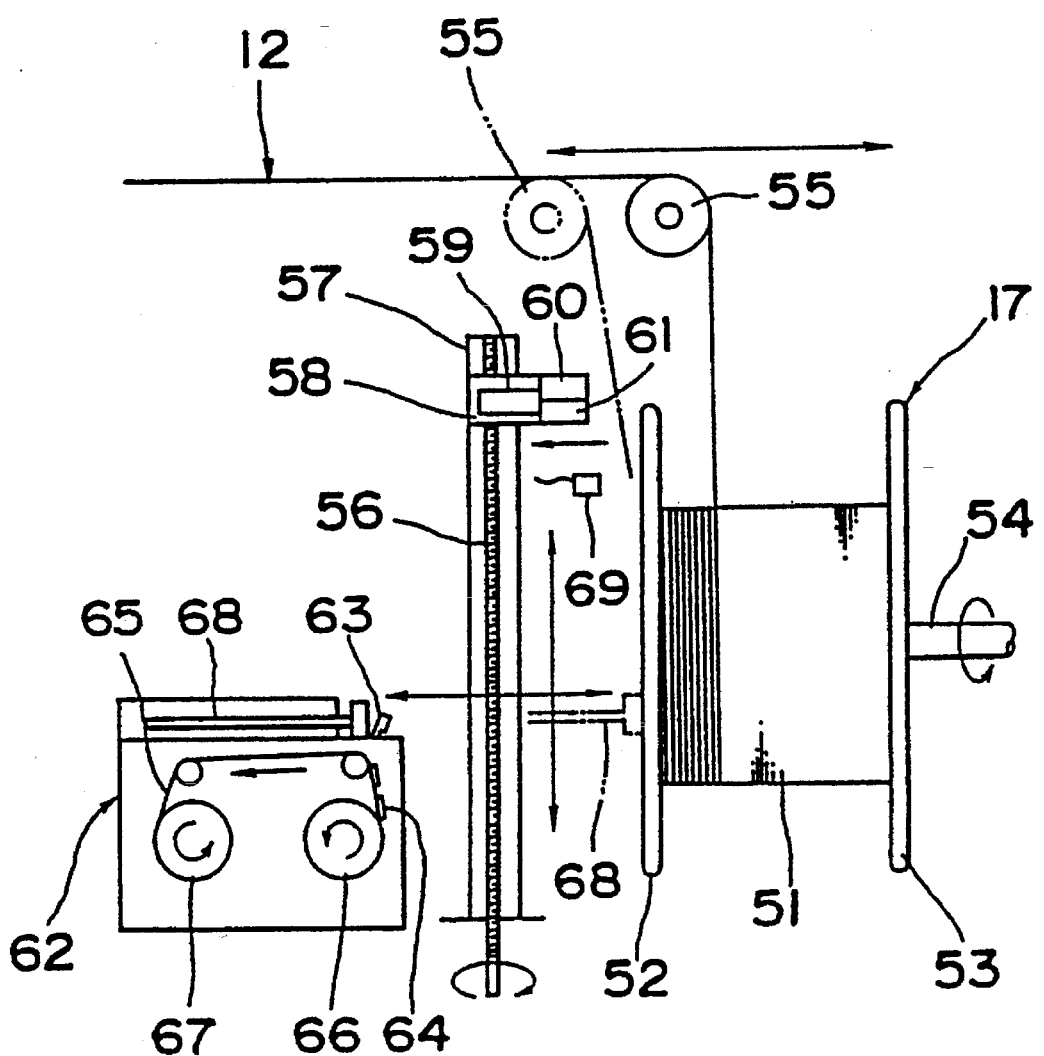
FIG. 9 is a side elevational view showing a continuous winding device according to an embodiment of the present invention.
Figure 10:
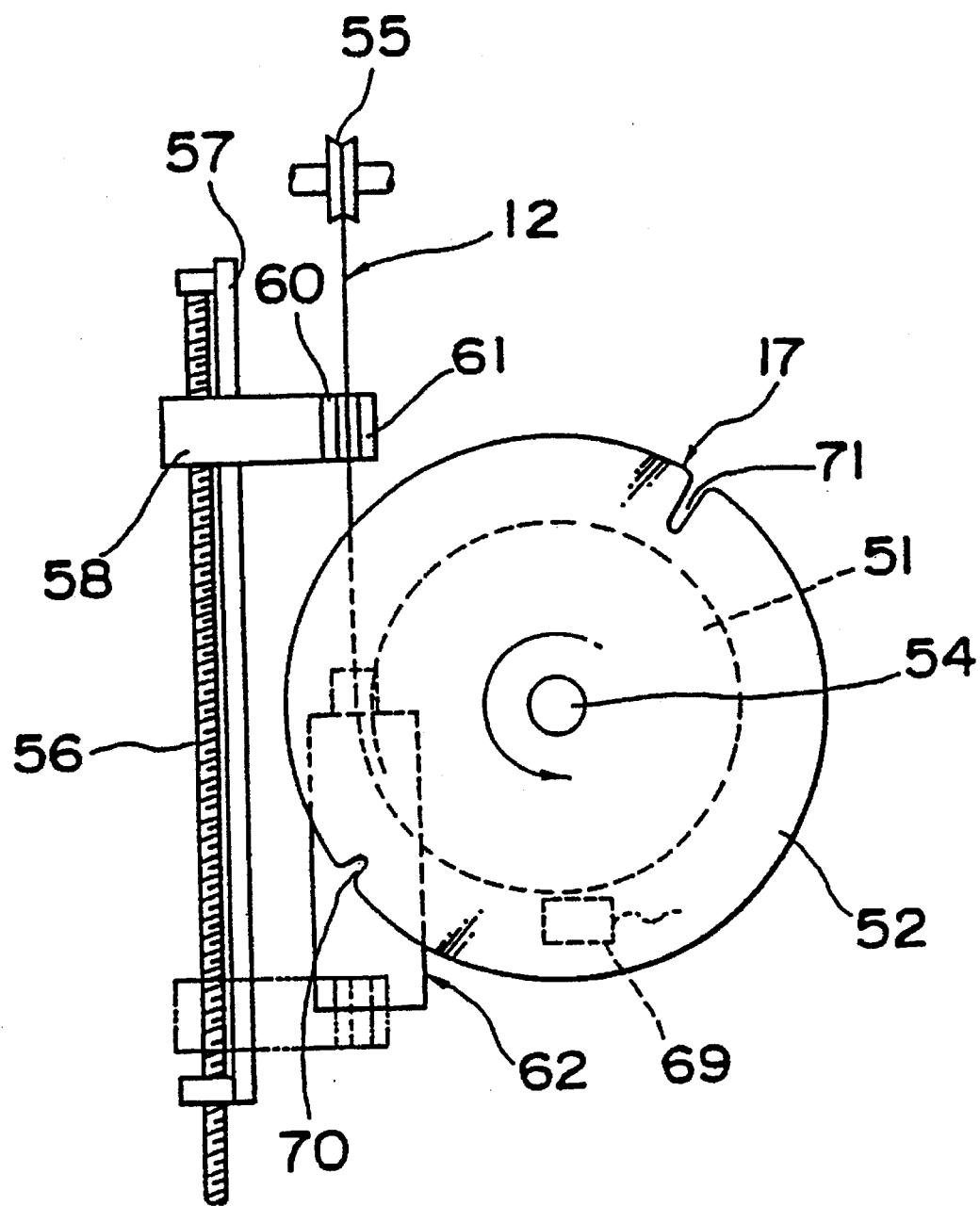
FIG. 10 is a front view showing the continuous winding device shown in FIG. 9.
Figure 11:
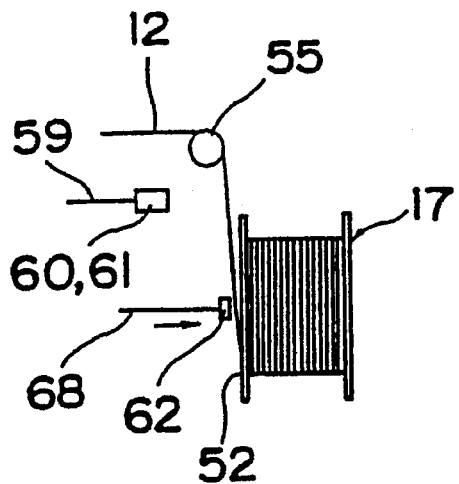
FIGS. 11a–11d are is a descriptive views showing winding procedure.
Figure 11:
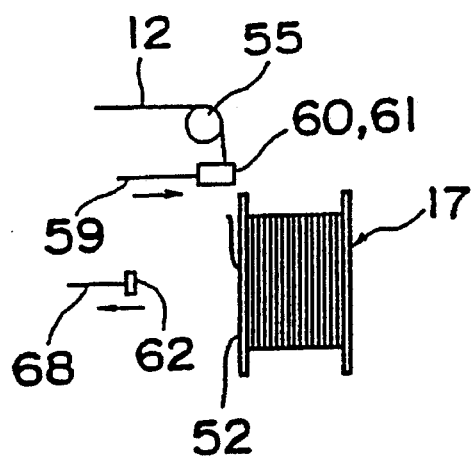
Figure 11:
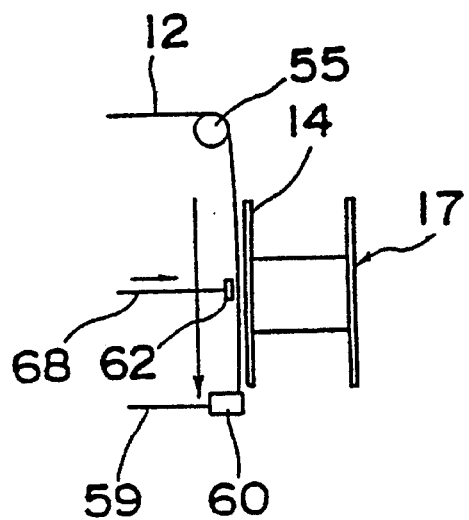
Figure 11:
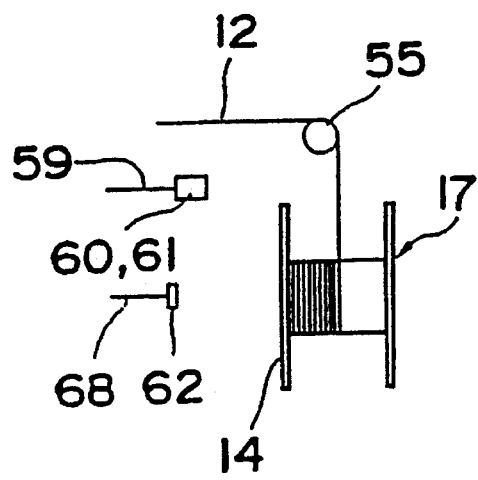
Figure 12:
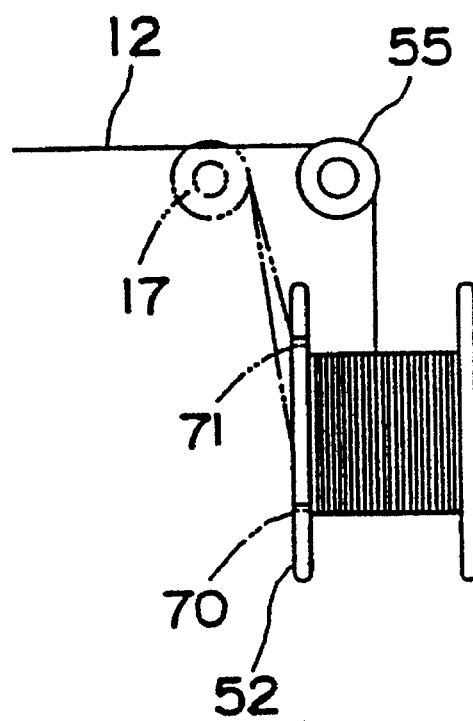
FIGS. 12a and 12b are descriptive views showing the processing of an end portion of an optical fiber.
Figure 12:
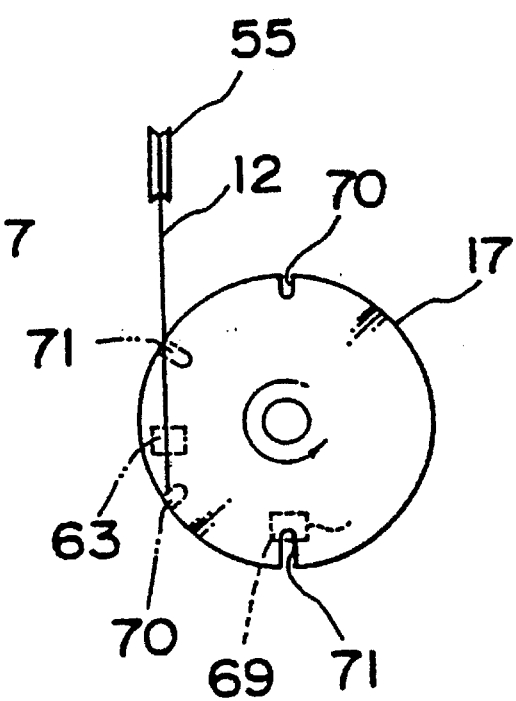

FIG. 9 and 10 show a continuous winding apparatus according to an embodiment of the present invention. FIG. 11 shows the procedure of winding an optical fiber. FIG. 12 shows the operation of processing an end portion of the optical fiber.

As shown in FIGS. 9 and 10, a winding reel 17 comprises a cylindrical winding portion 51 for winding the optical fiber 12 and flanges 52 and 53 integrally fixed to both sides of the winding portion 51. The shaft 54 of the winding portion 51 is connected with an unshown pulse motor. A guide roller 55 having a shaft perpendicular to the shaft 54 of the winding reel 17 is disposed above the winding reel 17. The guide roller 55 is moved by an unshown device in a direction along the shaft 54 of the winding reel 17.

A ball thread shaft 56 is disposed vertically alongside the winding reel 17 and rotatably supported by a frame 57. The shaft of an unshown driving motor is connected with one end of the ball thread shaft 56. A moving member 58 is screwed into the ball thread shaft 56 and moves vertically by the rotation of the ball thread shaft 56.

Referring to FIG. 9, a piston cylinder 59 having a piston rod movable toward the winding reel 17 is mounted on the moving member 58. A gripping portion 60 for gripping the optical fiber 12 and a cutter 61 for cutting it are installed on the leading end of the piston rod. After a predetermined amount of the optical fiber 12 is wound around the winding reel 17, the piston cylinder 59 is operated. As a result, the optical fiber 12 is gripped by the gripping portion 60 and cut by the cutter 61.

A tape sticking device 62 is disposed alongside the ball thread shaft 56. The tape sticking device 62 comprises a roller 66 around which band-shaped paper 65 having a plurality of tapes 64 stuck thereto is wound; a driving roller 67 for winding the paper 65 around it; and a piston cylinder 68 for sticking the tape 64 to the end face of the flange 52 of the winding reel 17 by sucking the tape 64.

Slits 70 and 71 for taking out the end portion of the optical fiber 12 wound around the winding portion 51 are formed on the flange 52 of the winding reel 17. More specifically, the slits 70 and 71 are formed on the periphery of the flange 52 of the winding reel 17 and spaced from each other by 180°. The slit 71 is deeper than the slit 70. The forward end of the optical fiber 12 is inserted into the slit 71 and the backward end thereof is inserted into the slit 70. A photoelectric sensor 69 serving as a means for detecting the position of the slit 70 is disposed alongside the winding reel 17 and connected with a pulse motor for driving the winding reel 17.

In order to replace the winding reel 17 having a sufficient amount of the optical fiber 12 wound around it, the photoelectric sensor 69 detects the slit 71, thus outputting a signal indicating the detected result as shown in FIG. 12b. As a result, the pulse motor drives the winding reel 17 at a slight speed. As shown in FIG. 12a, when the guide roller 55 is moved from a position above the winding portion 51 shown by a solid line to a position shown by a two-dot chain line, the optical fiber 12 in sliding contact with the periphery of the flange 52 is caught by the slit 71 when the optical fiber 12 is at a predetermined position shown by a two-dot chain line of FIG. 12. Consequently, the optical fiber 12 is inserted into the slit 71. Then, the optical fiber 12 is taken out from the winding reel 17 through the slit 70.

Then, as shown in FIG. 11a, the piston cylinder 68 of the tape sticking device 62 is operated and the tape 64 is sucked. Thereafter, as shown in FIG. 12b, the tape 64 is stuck to a predetermined position of the outer surface of the flange 52 of the winding reel 17 and the backward end of the optical fiber 12 is locked at the predetermined position of the surface of the flange 52. Then, the piston cylinder 59 is operated so that the gripping portion 60 grips the optical fiber 12 and the cutter 61 cuts the gripped portion of the optical fiber 12 as shown in FIG. 11b. Then, the winding reel 17 is replaced with the winding reel 17 vacant of the optical fiber 12 by an unshown replacing device. The flange 52 of the winding reel 17 locks the optical fiber 12 by means of the tape 64 at a position 20 cm distant from the backward end of the optical fiber 12 supposing that the diameter of the winding reel 17 is 40 cm. Therefore, the optical fiber 12 is not an obstacle to the transportation of the winding reel 17.

The optical fiber 12 is wound around the winding reel 17 which has replaced the winding reel having the predetermined amount of the optical fiber 12 wound around it. As shown in FIG. 11b, the backward end of the cut optical fiber 12 on the guide roll 55 side is gripped by the gripping portion 60. Then, the ball thread shaft 56 is rotated in this condition to move the moving member 58 downward. As a result, as shown in FIG. 11c, the backward end of the optical fiber 12 gripped by the gripping portion 60 is pulled downward. Then, similarly to the above description, the piston cylinder 68 of the tape sticking device 62 is operated to stick the tape 64 to the predetermined position of the outer surface of the flange 52 of the winding reel 17. Then, the backward end of the optical fiber 12 is locked at the predetermined position of the flange 52.

The optical fiber 12 is released from the gripping portion 60 and the ball thread shaft 56 is rotated to be returned to the original position. The photoelectric sensor 69 detects the slit 71 and outputs a signal indicating the detected result to the pulse motor. In response to the signal, the pulse motor drives the winding reel 17 at a slight speed as shown in FIG. 12b. When the guide roller 55 is moved from the position shown by the two-dot chain line of FIG. 12a to the position above the winding portion 51 shown by the solid line of FIG. 12a, the optical fiber 12 in sliding contact with the periphery of the flange 52 is caught by the slit 70 when the slit 70 is at the predetermined position shown by the two-dot chain line of FIG. 12a. Then, the optical fiber 12 is inserted into the slit 70. As a result, the optical fiber 12 is introduced into an inner portion of the winding reel 17 through the slit 70. Thereafter, as shown in FIG. 11d, the winding reel 17 is rotated to wind the optical fiber 12 around it.

The optical fiber 12 is wound continuously around the winding reel 17 by repeating the above-described process. In this case, the forward end of the optical fiber 12 and the backward end thereof are taken out outward from the flange 52 and stuck to the predetermined position of the flange 52 with the tape 64. Thus, the end portions of the optical fiber 12 can be reliably held by the winding reel 17. The end portions of the optical fiber 12 are held by the flange 52 without using the flange 53 of the other side of the winding reel 17. Therefore, only one tape sticking device is used.

As described above, according to the continuous winding apparatus of the present invention, an optical fiber supported by the guide roller is wound around the rotatable winding reel an cut by the cutter. Then, the end portion of the optical fiber is held by the winding reel by means of the tape sticking device. Accordingly, the end portion of the optical fiber is reliably held by the winding reel and as such, the optical fiber does not become loose.

Further, slits are formed on the flange of the winding reel and the means for detecting the position of one of the slits is provided. When the winding reel is at a predetermined rotational position, the optical fiber is inserted into the slit so as to hold the end portion of the optical fiber on the outer surface of the flange by means of the tape. That is, the end portion of the optical fiber can be easily held by the apparatus of a simple construction.

Figure 13:
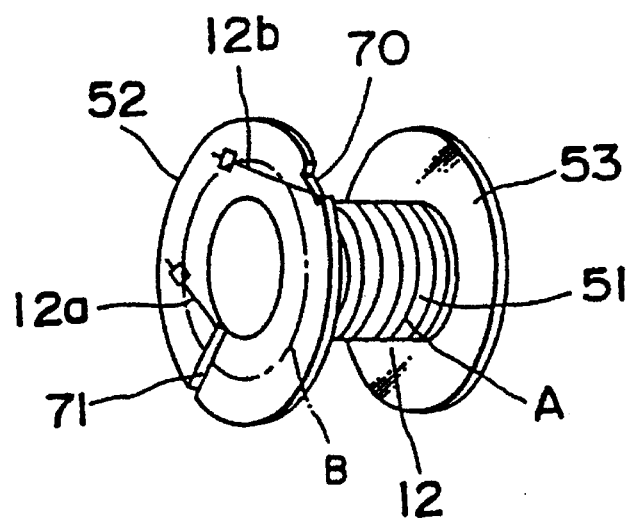
FIG. 13 is a perspective view showing an example of a winding reel, on which an optical fiber is wound, according to the present invention.

FIG. 13 is a perspective view showing an example of a winding reel, for winding an optical fiber around the drum thereof, according to an embodiment of the present invention is wound.

Referring to FIG. 13, the winding reel comprises flanges 52 and 53, a drum 51, and two slits 70 and 71 formed on the flange 52. The length of the slit 71 is equal to the distance obtained by subtracting the radius of the drum 51 from the radius of the flange 52. The bottom end of the slit 70 does not reach the cylindrical surface obtained by winding the optical fiber 12 around the drum to the maximum (circumference (B)) as shown by one-dot chain line of FIG. 13.

The forward end portion 12a of the optical fiber 12 is locked at the outer surface of the flange 52 and then inserted through the slit 71. Thus, the optical fiber 12 is wound around the drum 51. The backward end 12b of the optical fiber 12 which has been wound is inserted through the slit 70 and locked also on the outer surface of the flange 52. That is, the forward end and the backward end of the optical fiber 12 are locked on the same plane. As disclosed in Japanese Patent Laid-Open Publication No. 64-38379, the approach of the slits 70 and 71 to the optical fiber 12 are detected by a sensor and then, a guide bar presses the optical fiber 12 into or from the drum 51 through the slits 71 and 70.

As shown in FIGS. 15a through 15c or FIGS. 15a through 15d, the bottom end of the slit 70 does not reach the cylindrical surface obtained by winding the optical fiber 12 around the drum to the maximum. Therefore, whether the optical fiber 12 is wound round the drum 51 in a small amount (FIG. 15c) or in a large amount (FIG. 15d), the optical fiber 12 is inserted through the slit 70 at the same position of the flange 52. Accordingly, it is unnecessary to adjust the positioning of the slit 70 later by determining the tape-sticking position at the start. That is, the ends of the optical fiber can be easily held on the winding reel 17 by only placing the tape sticking device aside the winding apparatus. The positioning of the slit 70 can be easily made by adjusting the feeding length of the tape sticking hand 64 and the position of the guide roller 55.

There is a possibility that the position at which the forward end of the optical fiber 12 is locked overlaps with the position at which the backward end thereof is locked if both positions are near. Therefore, favorably, the line connecting the slit 70 and the center of the flange 52 with each other makes an angle of more than 90° and more favorably, 180° with the line connecting the slit 71 and the center of the flange 52 with each other. In this manner, the forward end and the backward end of the optical fiber 12 do not interfere with each other. Preferably, the outer surface of the flange 52 is smooth so that the tape can be easily stuck thereto.

Figure 14:
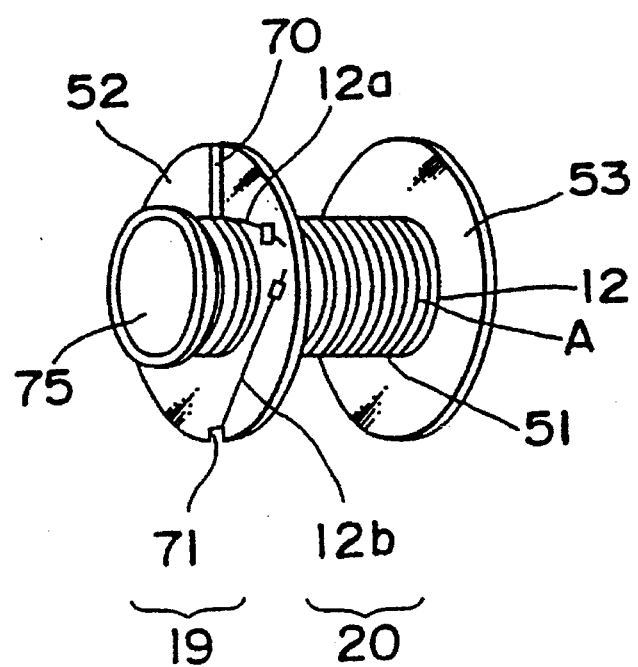
FIG. 14 is a perspective view showing another example of a winding reel, on which an optical fiber is wound, according to the present invention.
Figure 15:
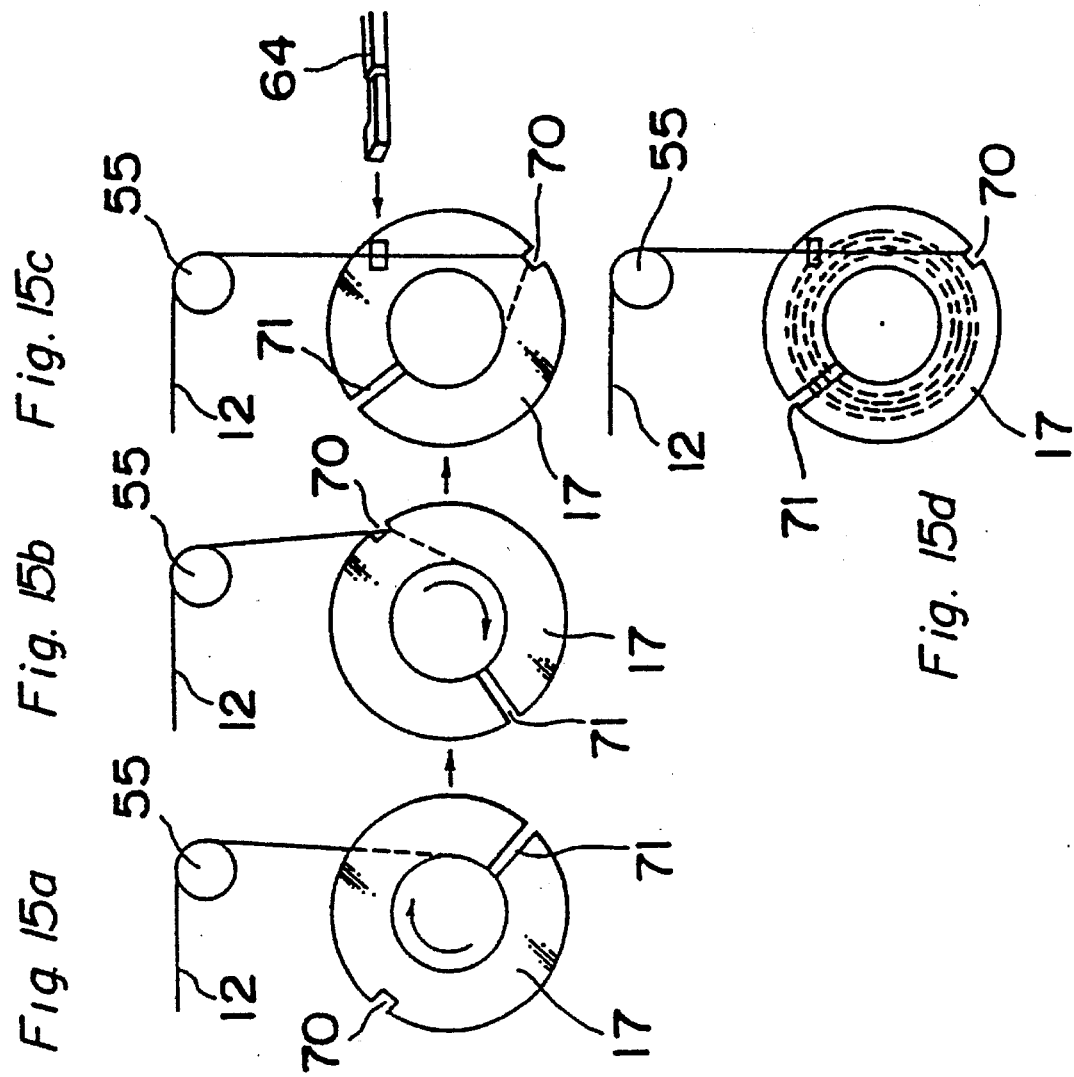
FIGS. 15a–15d are descriptive views showing the effect obtained by a shallow slit of a winding reel according to the present invention.

FIG. 14 is a perspective view showing a state in which the optical fiber 12 has been wound around the drum of a winding reel according to an embodiment of the present invention.

In a conventional winding reel, it is necessary that a portion for winding on the drum thereof the lead of the optical fiber several meters to several tens of meters is provided to evaluate the characteristic of the optical fiber 12. FIG. 14 shows a winding reel having the lead winding 10 portion.

Two slits 70 and 71 are formed on an intermediate flange 52 dividing the drum into a portion 19 for winding the lead and a portion 20 for winding the optical fiber 12 as shown in FIGS. 13 and 14. The end portions of the optical fiber 12 are locked on the outer surface of the intermediate flange 52. In order to prevent the hand of the tape sticking device from contacting a flange 75 of the portion 19, it is desirable that the diameter of the flange 75 is smaller than that of the intermediate flange 52 and high enough to prevent the optical fiber 12 wound on the lead winding portion 19 from falling from the drum. Thus, the type sticking hand 64 can be easily approached to the winding reel and the optimum tape-sticking position can be easily set.

The manufacturing equipment of the optical fiber such as a drawing equipment, a coloring equipment and a rewinding equipment means all processes including the process for winding the optical fiber around the winding reel.

The winding reel according to the present invention is composed of ABS resin, polypropylene resin or other engineering plastic and processed by injection molding. Otherwise, the flange and the drum may be separately produced and combined later.

As described above, according to the winding reel of the present invention, the forward end and backward end of the optical fiber are locked on the same plane and the backward end thereof can be locked at the same position irrespective of the length of the optical fiber which has been wound around the drum of the winding reel.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for sucking a free end of a traveling optical fiber having a sucking nozzle disposed downstream of a capstan wheel around which the traveling optical fiber is wound, in which a sucking opening of said sucking nozzle is disposed within a range of movement of a path line of the free end of the optical fiber, said path line moving within the range of movement in accordance with a speed of travel of the optical fiber, said path line extending within a plane perpendicular to a longitudinal axis of said capstan wheel, said sucking nozzle positioned perpendicular to the plane of the path line.

2. The apparatus for sucking a free end of an optical fiber according to claim 1, further comprising a waste accommodation box associated with said sucking nozzle for receiving and retaining optical fiber.

3. The apparatus for sucking a optical fiber according to claim 1, an inner diameter of a sucking opening of said sucking nozzle being equal to or greater than 10 millimeters.

4. The apparatus for sucking an optical fiber according to claim 1, a distance between a sucking opening of said sucking nozzle and the plane of the path line of the free end of the optical fiber is less than 10 millimeters.

5. An apparatus for sucking a free end of a traveling optical fiber having a sucking nozzle disposed downstream of a capstan wheel around which the traveling optical fiber is wound, in which said sucking nozzle is disposed within a range of movement of a path line of the free end of the optical fiber, said path line moving within a range of movement in accordance with a speed of travel of the optical fiber, said path line extending within a plane perpendicular to a longitudinal axis of said capstan wheel, said sucking nozzle positioned alongside the plane of the path line of said optical fiber, an opening of said sucking nozzle positioned out of and transverse to the plane of the path line.

6. An apparatus for sucking an optical fiber as defined in claim 5, wherein the inner diameter of the sucking opening of said sucking nozzle is 10 mm or more.

7. An apparatus for sucking an optical fiber as defined in claim 5, wherein the distance between the sucking opening of said sucking nozzle and said path line of the optical fiber is less than 10 mm.

8. The apparatus for sucking an optical fiber according to claim 5, further comprising a fiber accommodating box associated with said sucking nozzle for receiving and retaining optical fiber.

9. A method for providing an apparatus for sucking a free end of an optical fiber, said method comprising:

providing a capstan wheel around which the optical fiber is wound;

providing a sucking nozzle downstream of said capstan wheel along a path line of movement of the free end of the optical fiber, the free end of the optical fiber moving within a range of movement of a path line in accordance with a speed of movement of the free end of the optical fiber, a plane of movement of the free end of the optical fiber being defined by the path line of the optical fiber and extending perpendicularly to a longitudinal axis of the capstan wheel, and positioning the sucking nozzle perpendicular to the plane of movement of the free end of the optical fiber.

10. The method for providing an apparatus for sucking a free end of an optical fiber according to claim 9, the step of providing a sucking nozzle includes accommodating waste fibers within the sucking nozzle.

11. The method for providing an apparatus for sucking a free end of an optical fiber according to claim 9, wherein positioning of the sucking nozzle includes positioning an opening of the sucking nozzle transverse to the plane of the movement of the free end of the optical fiber.

* * * * *